(No Model.)
C. M. LUNGREN.
GAS REGULATOR.
No. 351,387. Patented Oct. 26, 1886.
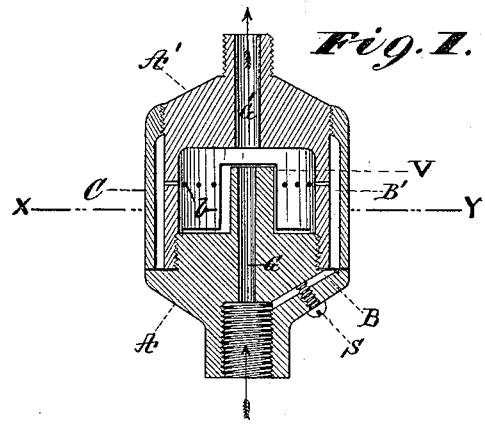
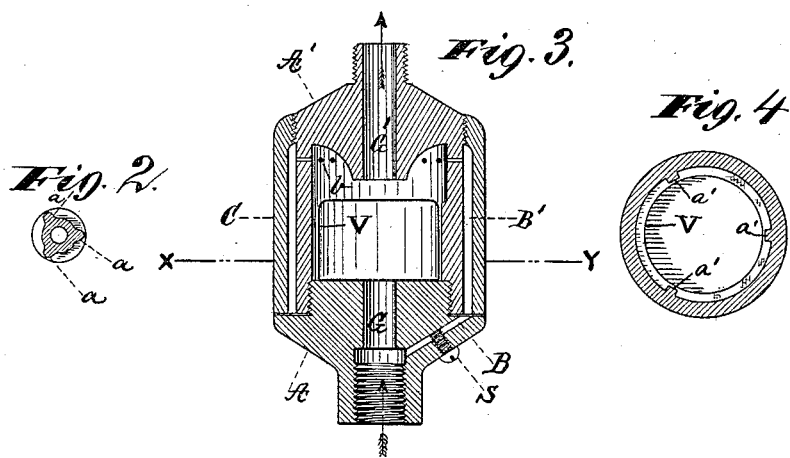
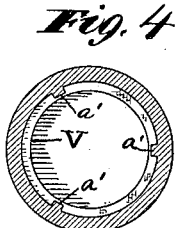
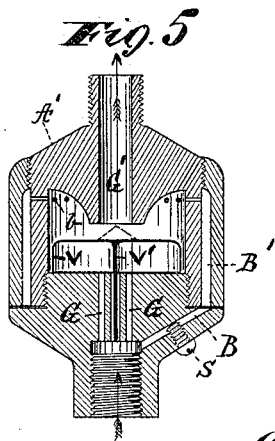
WITNESSES:
Gabriel J. W. Galster
Wm. N. Capel
INVENTOR
Chas. M. Lungren.
BY
H. C. Townsend
ATTORNEY
N. PETERS, Photo-Lithographer, Washington, D. C.

UNITED STATES PATENT OFFICE.

CHARLES M. LUNGREN, OF NEW YORK, N. Y.

GAS-REGULATOR.

SPECIFICATION forming part of Letters Patent No. 351,387, dated October 26, 1886.

Application filed June 14, 1886. Serial No. 205,098. (No model.)

*To all whom it may concern:*

Be it known that I, CHARLES M. LUNGREN, a citizen of the United States, and a resident of New York, in the county of New York and State of New York, have invented certain new and useful Improved Gas-Regulators, of which the following is a specification.

My invention relates to that class of gas-regulators, termed "dry gas regulators," in which the flow of gas is controlled by a float moving in a dry-chamber, and in which the seal to prevent free and unobstructed passage of gas around the edges of the float is made by constructing the float to fit closely in the chamber in which it moves, instead of by providing the float with a rim or inverted bell, whose edges are at all times immersed in a sealing-liquid.

In this class of regulators as heretofore constructed it has been usual to make the float fit very nicely in the chamber in which it moves, in order to prevent, as far as possible, the passage of gas between them, and the float has been so arranged that, when in its lowest position, the normal gas-passage controlled by it is wide open. The chief difficulty experienced with regulators of this kind is their liability to stick, owing to the deposit formed on the traveling surfaces by the continued passage of gas over them or between the edges of the float and the chamber in which it moves. When a dry-regulator of this kind has its gas-passages arranged as just specified, so that when the float is down the gas is free to enter the chamber, if it should stick with the float down (which is the position in which it is most likely to meet with this mishap, inasmuch as there is no counteracting force) the only pressure available to loosen it is the difference between the pressure below it and above it, which is at all times very slight. In the above class of regulators it has also been customary to perforate the float, in order to permit the discharge of gas from the inlet-opening to the exit-opening, and with such perforations in the float it becomes all the more necessary to make a tight fit of the float in its chamber, in order that there may not be so great an escape around the edge of the float as to prevent the existence of the difference of pressure above and below the float, which is necessary to sustain the same when in action. To overcome these difficulties, I arrange the float in a regulator of the above description in such a relation to the gas inlet and outlet that the inlet is shut entirely off when the float is in its lowest position, and I mount the float in such a way as to obviate the necessity of a gas fit between it and its guiding-surfaces. With this construction, should the float stick in its lowest position, the whole pressure of the gas is available to dislodge it, while if it is stuck too tightly to be moved by the gas-pressure no gas can pass through the regulator.

In the drawings I have shown three ways of mounting the float in accordance with my invention.

Figure 1 is a vertical central section of a gas regulator constructed in accordance with my invention. Fig. 2 is a cross-section through the pipe-opening beneath the float. Fig. 3 is a vertical central section of a modified form of the invention. Fig. 4 is a cross-section through the same and illustrates the location of the guiding projections for the float. Fig. 5 is a vertical central section of another modification.

In Fig. 1 A and A' are the bottom and top pieces of the regulator, and V the float moving in the chamber formed between the two pieces A and A'. The gas-inlet G is prolonged up into this chamber, forming a central hub or nipple over which the float V is fitted. This hub is provided with three or more vertical ribs, *a a a*, Fig. 2, which form the guiding-surfaces for the float V. The float V is an unperforated float, so that the space between the edges of the same and the wall of the chamber in which it moves forms substantially the passage for the gas from the inlet to the outlet. The float rests when in its lowest position upon the top of the central hub, thus wholly shutting off the inlet G. The outer edge of the float is of such diameter as to leave a small annular space between it and the wall of the chamber sufficient to pass from eighty to ninety per cent. of the gas the regulator is designed to deliver.

To be able to adjust the amount to be delivered from the regulator to a nicety, and to adapt it to different qualities of gas, I provide a by-pass, B B', around the float, which by-pass communicates with the gas-chamber above the float through a number of small openings, *b b*. As shown, B is a channel drilled in the piece A. This communicates with the annular space B', formed between the wall of A' and the outer shell, C. A screw valve or plug, S, controls the amount of gas which can pass through the channel B.

G' is the exit for the gas to the burner.

In operation the gas passes up through the passage G and raises the float V. It then passes down through the annular space between the float and the central hub, and then out around the edge of the float. The pressure of the gas under the float keeps it suspended at such a point that the space between the top of the float and bottom of outlet G' will be of the right size to pass the determined amount of gas. By allowing a small amount of gas to enter the gas-chamber above the float through the by-pass, the pressure on the top of the float is increased. The float therefore descends until it reaches a new position of equilibrium.

In Fig. 3 the construction of all the parts is the same as in Fig. 1, except in the manner of mounting the float V. In this case the float moves in three or more vertical guides arranged on the interior wall of the gas-chamber, as shown in section, Fig. 4, and the gas-inlet is closed by the float resting on the floor of the chamber in which it moves.

In Fig. 5 the float V is guided by means of a central stem, v', and a sufficient space is left between the inner wall of the gas-chamber and the outer surface of the float to allow the desired quantity of gas to pass.

In all of the figures the fit of the float on its guides is simply such a one as to insure the easy movement of the float.

Instead of forming the limiting exit between the flat top of the float and the bottom of the passage G', the float may be provided with a conical or semi-spherical projection to enter the lower end of the gas-passage G', as shown by the dotted lines in Fig. 5.

What I claim as my invention is—

1. In a dry gas-regulator substantially such as described, the combination of a gas-chamber, an inlet thereto and an outlet therefrom, and a float or check having a gas-passage around its edge and arranged to move in the gas-chamber between the inlet and outlet in such relation to the two that as gas is admitted to chamber by the upward movement of the float the passage through which it can escape from the chamber is diminished, substantially as and for the purpose described.

2. In a gas-regulator, the combination of a gas-chamber, an inlet thereto and an outlet therefrom, and a float or check arranged to move in the gas-chamber between the inlet and outlet and in such relation to the two that as gas is admitted to the chamber by the upward movement of the float the exit-passage is diminished, and an adjustable passage leading from the gas inlet or space below the float to the space above the float, substantially as and for the purpose specified.

3. In a dry gas-regulator substantially such as described, the combination of a float-valve sustained by direct pressure of the gas beneath it, an exit-valve controlled by the position of the float and serving to pass less gas as the float rises in its chamber, and an inlet closed by the valve when in its lowest position.

4. In a gas regulator, the combination of a gas-chamber, a float sustained therein by the pressure of gas, an inlet to said chamber closed by the float when in its lowest position, an outlet or exit passage therefrom which is diminished by the upward movement of the float, and an adjustable by-pass connecting the passages or space beneath the valve with the space or passage above the same.

5. In a dry gas-regulator, the combination, with inlet and outlet openings, of a float controlling the same, and sustained by pressure of gas beneath it, and a gas-passage from the inlet to the outlet around the edge of the float, as and for the purpose described.

6. In a dry gas-regulator substantially such as described, a float-valve, a gas-chamber in which the float moves, and an inlet to said chamber closed when the float is in its lowest position.

7. In a dry gas-regulator, the combination, substantially as described, of a gas-chamber, a float moving in the same, so as when raised by pressure of gas to permit the access of gas to the surfaces of the float that are presented to the walls of the chamber, and an inlet-opening closed by the valve when in its lowest position.

Signed at New York, in the county of New York and State of New York, this 10th day of June, A. D. 1886.

CHARLES M. LUNGREN.

Witnesses:
WM. H. CAPEL,
WM. HENRY GARDINER.